U012454053B2

United States Patent
Gomez

(10) Patent No.: US 12,454,053 B2
(45) Date of Patent: Oct. 28, 2025

(54) CONTROL DEVICE, ROBOT SYSTEM, CONTROL METHOD, AND STORAGE MEDIUM

(71) Applicant: HONDA MOTOR CO., LTD., Tokyo (JP)

(72) Inventor: Randy Gomez, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 18/197,747

(22) Filed: May 16, 2023

(65) Prior Publication Data

US 2023/0373088 A1    Nov. 23, 2023

(30) Foreign Application Priority Data

May 19, 2022  (JP) .................................. 2022-082356

(51) Int. Cl.
*B25J 9/16* (2006.01)
*G06V 10/46* (2022.01)

(52) U.S. Cl.
CPC ........... *B25J 9/1661* (2013.01); *B25J 9/1697* (2013.01); *G06V 10/462* (2022.01)

(58) Field of Classification Search
CPC .... G06V 20/20; G06V 40/172; G06V 40/161; G06V 10/462; B25J 9/1661; B25J 9/1697; B25J 11/0005; G05B 2219/36488; G05B 2219/40411; G05B 2219/33056
See application file for complete search history.

(56) References Cited

U.S. PATENT DOCUMENTS

| | | | | |
|---|---|---|---|---|
| 9,183,560 | B2 * | 11/2015 | Abelow | G06Q 30/0601 |
| 11,222,298 | B2 * | 1/2022 | Abelow | G06Q 10/067 |
| 11,615,030 | B2 * | 3/2023 | Onishi | G06F 12/0895 |
| | | | | 711/154 |
| 2021/0253543 | A1 * | 8/2021 | Schmidt | C07D 263/44 |
| 2023/0173683 | A1 * | 6/2023 | Gomez | G06F 3/017 |
| | | | | 700/246 |

OTHER PUBLICATIONS

Moulin-Frier, et al., DAC-h3: A Proactive Robot Cognitive Architecture to Acquire and Express Knowledge About the World and the Selfwledge About the World and the Self, 2017, IEEE, p. 1005-1022 (Year: 2017).*

Craye et al., RL-IAC: An exploration policy for online saliency learning on an autonomous mobile robot, 2016, IEEE, p. 4877-4884 (Year: 2016).*

(Continued)

*Primary Examiner* — Mcdieunel Marc
(74) *Attorney, Agent, or Firm* — Amin, Turocy & Watson, LLP

(57) ABSTRACT

A control unit is configured to monitor knowledge data in which element information relating to an operation environment of a robot is integrated and, when the element information of a predetermined item changes, identify a salient feature relating to the element information of the item, and operate the robot on the basis of an operation plan relating to a salient feature identified from related data representing at least a relevance between the salient feature and the operation plan of the robot.

7 Claims, 10 Drawing Sheets

(56) References Cited

OTHER PUBLICATIONS

Yared et al., Plan recognition and generalization in command languages with application to telerobotics, 1991, IEEE, p. 327-338 (Year: 1991).*

Wyatt et al., Self-Understanding and Self-Extension: A Systems and Representational Approach, 2010, IEEE, p. 282-303 (Year: 2010).*

Developing a Robot's Empathetic Reactive Response Inspired by a Bottom-Up Attention Model, Randy Gomez, Yu Fang, et al., International Conference on Social Robotics, ICSR 2021: Social Robotics 2021, pp. 85-95, Nov. 2, 2021, Springer, Cham.

* cited by examiner

FIG. 6 hasAnalysis(?Person, ?analysis)^
        isSmiling(?analysis, true)
=> isInGoodMood(?person, true)

FIG. 7

Person(?person)^
makeOWLIndividual(?stimulus, ?person)
=> PersonAppears(?stimulus)

FIG. 9

| SALIENT FEATURE | EVENT OF INTEREST INFORMATION | OPERATION PLAN | DESCRIPTION |
|---|---|---|---|
| FAMILIARITY | KNOWN PERSON | RECOGNITION | EXPRESS THANK TO PERSON USING NAME |
|  | KNOWN SUBJECT | CHATTING | TALK ABOUT CERTAIN TOPIC RELATING TO KNOWN TOPIC |
|  | TAKING TOWARD TASTE | CHANGE OF SUBJECT | CHANGE TOPIC TO FAVORABLE TOPIC |
| REFERRING | INSTRUCTION OF DIRECTION | VISUAL RECOGNITION OF INSTRUCTED DIRECTION | VISUALLY RECOGNIZE DIRECTION DIRECTED BY PERSON |
| NOVELTY | APPEARANCE OF PERSON | GREETING | GREET TO APPEARING PERSON |
|  | DISAPPEARANCE OF PERSON | FAREWELL | GENERATE SPEECH OF WORDS OF FAREWELL TO LEAVING PERSON |
|  | NOISE | REBOUND | EXPRESS SURPRISE USING MOTION |
| UNEXPECTEDNESS | NEGATIVE SPEECH GENERATION | SADNESS | EXPRESS SADNESS USING MOTION AS RESPONSE TO NEGATIVE SPEECH |

CONTROL DEVICE, ROBOT SYSTEM, CONTROL METHOD, AND STORAGE MEDIUM

CROSS-REFERENCE TO RELATED APPLICATION

Priority is claimed on Japanese Patent Application No. 2022-082356, filed May 19, 2022, the content of which is incorporated herein by reference.

BACKGROUND OF THE INVENTION

Field of the Invention

The present invention relates to a control device, a robot system, a control method, and a storage medium.

Description of Related Art

Techniques for achieving interaction with a person for a long period by employing a social robot companion have been proposed. For example, in the following Non-Patent Document 1, a desktop robot realizing emotion expressions using an animation character for an external stimulus is disclosed. In an emotion expression, a responsive behavior for an external stimulus is applied. Characteristics of a robot can be designed using a Stimulus-Response pair (S-R).

[Non-Patent Document 1]"Developing a Robot's Empathetic Reactive Response Inspired by a Bottom-Up Attention Model", Randy Gomez, Yu Fang, et al., International Conference on Social Robotics, ICSR 2021: Social Robotics 2021, pp. 85-95, 2 Nov. 2021, Springer, Cham

SUMMARY OF THE INVENTION

However, various factors, for example, driving, emotions, and perceptions according to environment stimuli and other high-order mechanisms relate to operations of a robot. For this reason, there are cases in which only consideration of a stimulus-response pair is insufficient in a social operation. For example, in Non-Patent Document 1, for realizing a life-like (alive) operation, an attention mechanism for detecting a signal to be responded to from a supplied stimulus has not been considered. In a social operation, there are cases in which a quick response to a stimulus is preferable. In such a stimulus, other than external environments, for example, information according to interactions with a person such as an internal state of a system, a mental state, and the like may be included.

An aspect of the present invention is formed in consideration of the problems described above, and an object thereof is to provide a control device, a robot system, a control method, and a storage medium contributing to a social operation.

(1) According to one aspect of the present invention, there is provided a control device including a control unit configured to monitor knowledge data in which element information relating to an operation environment of a robot is integrated and, when the element information of a predetermined item changes, identify a salient feature relating to the element information of the item, and operate the robot on the basis of an operation plan relating to a salient feature identified from related data representing at least a relevance between the salient feature and the operation plan of the robot.

(2) In the aspect (1), in the related data, a constraint condition is associated with at least some of the operation plans, and the control unit may determine whether or not the element information of the predetermined item satisfies a constraint condition corresponding to an operation plan relating to the identified salient feature and, when the constraint condition is not satisfied, be configured not to operate the robot on the basis of the operation plan relating to the salient feature.

(3) In the aspect (2), the knowledge data includes element information of a plurality of items, and the element information of the plurality of items is associated on the basis of attributes of the items, and the control unit may convert detection information detected from the operation environment into perception information of an attribute set in advance and update element information of which an attribute is common to the perception information on the basis of the perception information.

(4) In the aspect (3), in the related data, with element information of a specific item, a rule representing an estimation condition of other element information relating to the element information is associated, and, when the element information of the specific item satisfies the estimation condition, the control unit may add the other element information to the knowledge data as element information relating to the element information of the specific item.

(5) In the aspect (4), when at least a part of the element information of the specific item is updated, the control unit may determine whether or not the estimation condition is satisfied.

(6) In the aspect (3), when a new person is detected on the basis of the perception information, the control unit may generate a new item for each attribute relating to the person and add element information, which relates to the person, of an attribute corresponding to the generated items to the knowledge data.

(7) According to one aspect of the present invention, there is provided a robot system including the robot described above and any one of the aspects (1) to (6) described above.

(8) According to one aspect of the present invention, there is provided a storage medium storing a program for causing a computer to function as any one of the aspects (1) to (6) described above.

(9) According to one aspect of the present invention, there is provided a control method for a control device, the control method using the control device including: a first step of monitoring knowledge data in which element information relating to an operation environment of a robot is integrated and, when the element information of a predetermined item changes, identifying a salient feature relating to the element information of the item; and a second step of operating the robot on the basis of an operation plan relating to a salient feature identified from related data representing at least a relevance between the salient feature and the operation plan of the robot.

An aspect of the present invention can contribute to a social operation of a robot.

According to the aspect (1), (7), (8), or (9) described above, when the element information of a predetermined item of knowledge data integrated in the knowledge data changes, a salient feature relating to the element information of the changed item is identified. The robot is operated on the basis of an operation plan relating to a salient feature identified from related data. By setting element information of an item of which a change is to be monitored in association with a salient feature in advance, the robot can be quickly operated in accordance with a change in the element information of the item.

According to the aspect (2) described above, in a case in which a constraint condition is satisfied for an operation plan with which the constraint condition is associated, the robot can be operated in accordance with the operation plan. For this reason, necessity and non-necessity of an operation are controlled in accordance with a more detailed situation of an operation environment of the robot.

According to (3) described above, various kinds of knowledge data representing an operation environment of a robot is hierarchically described, and element information of which an attribute is common is updated in accordance with movement of perception information converted from detection information. Since element information relating to an item in which movement has occurred is focused on among items that are items in which element information that is a processing target is a monitoring target, the robot can be quickly operated as a response to a change in the operation environment.

According to the aspect (4) described above, when element information of a specific item satisfies an estimation condition represented in a rule, other element information relating to the element information is estimated. The estimated other element information can be referred to in the identifying of a salient feature. Even other element information not directly derived from an operation environment can be acquired from element information that is directly derived. For this reason, for the robot, more varied operations can be realized on the basis of the other element information that is estimated.

According to the aspect (5) described above, a process relating to determining whether an estimation condition is satisfied is not performed when element information not relating to element information of a specific item is updated or in a case in which even element information relating to a specific item is not updated. For this reason, a reactive behavior based on update of element information relating to a specific item can be quickly realized.

According to the aspect (6) described above, element information based on detection information can be hierarchically managed in accordance with detection of a new person. For this reason, for a robot, an operation corresponding to an attribute or an operation of each person can be efficiently realized.

BRIEF DESCRIPTION OF THE DRAWINGS

FIG. 6 is a diagram illustrating a first example of a generation rule of element information according to this embodiment.

FIG. 7 is a diagram illustrating a second example of a generation rule of element information according to this embodiment.

FIG. 9 is a diagram illustrating a correspondence relation between a salient feature, event of interest information, and an operation plan according to this embodiment.

DETAILED DESCRIPTION OF THE INVENTION

Figure 1:
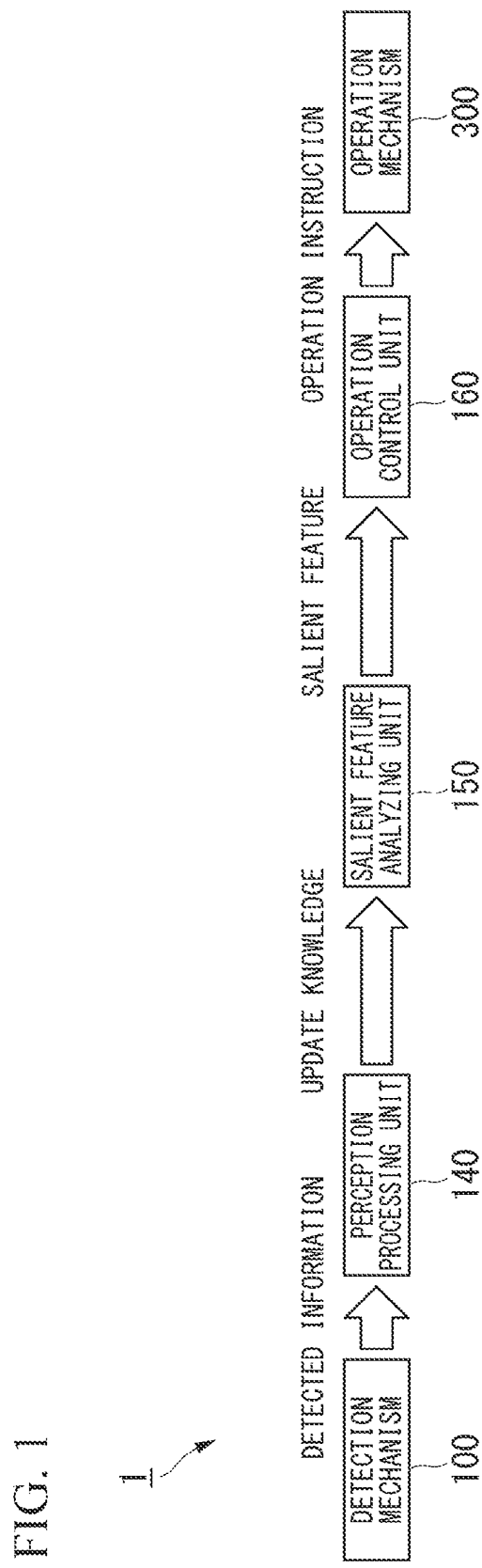
FIG. 1 is a schematic block diagram illustrating an overview of a robot system according to this embodiment.

Hereinafter, an embodiment of the present invention will be described with reference to the drawings. First, an overview of this embodiment will be described. FIG. 1 is a schematic block diagram illustrating an overview of a robot system 1 according to this embodiment. The robot system 1 includes a detection mechanism 100, a perception processing unit 140, a salient feature analyzing unit 150, an operation control unit 160, and an operation mechanism 300.

In the robot system 1, knowledge data and related data are stored. The knowledge data is configured to include element information of a plurality of items. The element information of the plurality of items is associated on the basis of attributes of respective items. The related data includes a salient feature and information representing an operation plan of a robot 20 (to be described below) and is configured by associating them with each other.

The detection mechanism 100 detects various kinds of detection information from an operation environment of the robot 20.

The perception processing unit 140 converts detection information detected by the detection mechanism 100 into perception information of a predetermined attribute according to a kind of the detection information. The perception processing unit 140 updates element information of which an attribute is common to the converted perception information in element information included in the knowledge data.

The salient feature analyzing unit 150 monitors the knowledge data and, when element information of a predetermined item changes, identifies a salient feature relating to the changed element information.

The operation control unit 160 refers to the related data and controls an operation of the robot 20 on the basis of an operation plan relating to the salient feature identified by the salient feature analyzing unit 150.

The operation mechanism 300 operates the robot 20 in accordance with control of the operation control unit 160.

Figure 2:
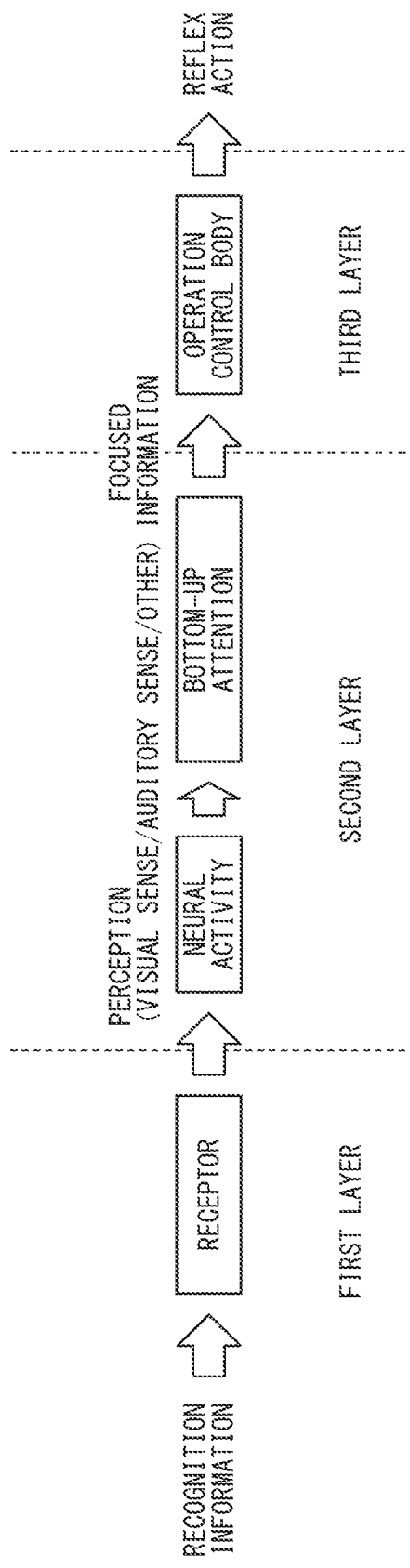
FIG. 2 is an explanatory diagram illustrating a function of an attention mechanism of a living body.

An operation model of the robot system 1 illustrated in FIG. 1 can be compared with an attention mechanism (attention system) included in a living body such as a person or the like. The attention mechanism is a living body mechanism that is responsible for a reactive behavior for an external environment. FIG. 2 is an explanatory diagram illustrating a function of the attention mechanism of a living body. The attention mechanism mainly has mechanisms of three layers. A first layer includes a receptor. The receptor receives recognition information based on external stimuli. A second layer includes a neural circuit and two paths. The recognition information from the first layer is caused to branch for each path. In two paths, there are a top-down attention (not illustrated) and a bottom-up attention. In the top-down attention, high-order information such as a context and an intention are referred to in addition to external environments. On the other hand, in the bottom-up attention, information to be focused on is extracted from characteristics directly derived from the recognition information. The bottom-up attention is taken charge of by the posterior parietal cortex of the brain and is involved in a relatively quick reactive behavior. A third layer is taken charge of by the superior colliculus of the brain and includes a neural connection with a sensorimotor area. In the second layer, a reactive behavior for focused information is controlled. Functions of the first layer, the second layer, and the third layer respectively correspond to the perception processing unit 140, the salient feature analyzing unit 150, and the operation control unit 160 according to this embodiment. The function of the salient feature analyzing unit 150 mainly corresponds to the bottom-up attention.

(Example of External Appearance Configuration)

Figure 3:
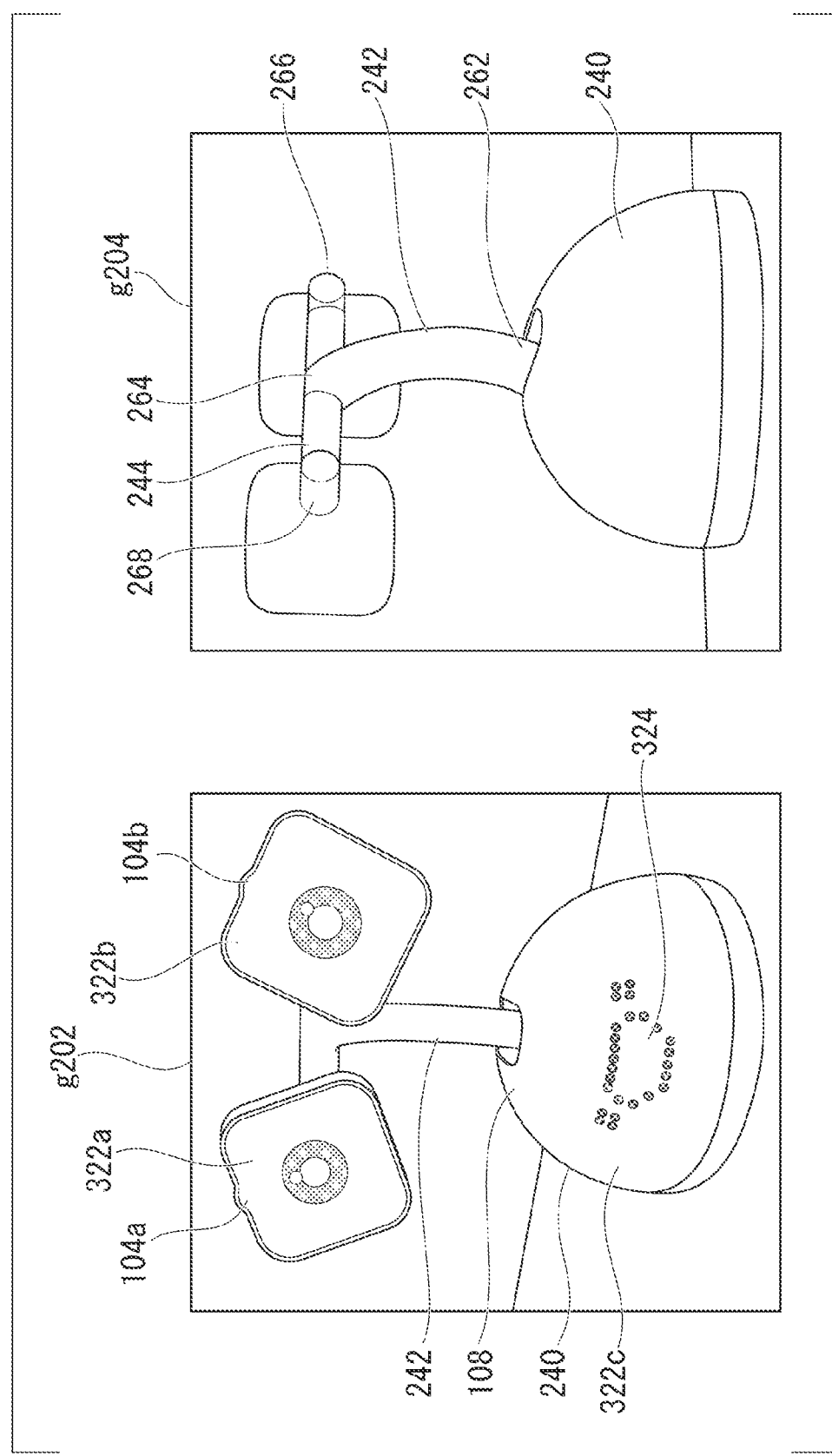
FIG. 3 is a diagram illustrating an example of an external appearance configuration of a robot configuring a robot system according to this embodiment.

Next, an example of the external appearance configuration of a robot 20 configuring the robot system 1 according to this embodiment will be described. FIG. 3 is a diagram illustrating an example of the external appearance configuration of the robot 20 according to this embodiment. FIG. 3 illustrates a front view g202 and a side view g204. In the example illustrated in FIG. 3, the robot 20 is configured as a companion robot of a desk top type.

The robot 20 includes three display devices 322a, 322b, and 322c as a display unit 322 and includes two imaging devices 104a and 104b as an imaging unit 104.

The imaging devices 104a and 104b are respectively mounted at positions deviating from centers of the display devices 322a and 322b to top sides. Each of the display devices 322a and 322b is configured to be able to present an image and imitates a person's eye. The display devices 322a and 322b are supported at both ends of a horizontal bar 244 through movable parts 266 and 268.

A sound emitting unit 324 is mounted on a side face of a casing 240. The sound emitting unit 324 can emit sound and imitates a person's mouth.

The display device 322c is installed near the sound emitting unit 324 and is configured to be able to be lighted.

The robot 20 includes a casing 240, three movable parts 262, 266, and 268, a boom 242, a horizontal bar 244, and three actuators 326 as constituent members. The three actuators 326 can be distinguished from each other by denoting them as 326a, 326b, and 326c. Illustrations of the actuators 326a, 326b, and 326c are omitted in FIG. 3.

The casing 240 is in contact with and supported by the bottom face and supports the whole robot 20. Inside the casing 240, a control device 10 (to be described below) and the actuator 326a are stored.

The boom 242 has its longitudinal direction toward a direction away from the casing 240 and is supported by being engaged with the movable part 266 at one end thereof. The actuator 326a is mounted at the bottom of the movable part 262, and an in-horizontal plane direction and an in-median plane direction of the boom 242 are configured to be changeable in accordance with movement of the actuator 326a. The in-horizontal plane direction corresponds to a horizontal direction. The in-median plane direction corresponds to an inclined direction with respect to the front face.

At the other end of the boom 242, the horizontal bar 244 is installed with its longitudinal direction directed toward the horizontal direction. The movable parts 266 and 268 are installed at both ends of the horizontal bar 244. Each of the movable parts 266 and 268 is rotatable around a rotation axis directed toward the longitudinal direction of the horizontal bar 244. On side faces of the movable parts 266 and 268, the display devices 322a and 322b are installed. The actuators 326b and 326c are embedded at both ends of the horizontal bar 244. The actuators 326b and 326c respectively rotate the movable parts 266 and 268. In accordance with this rotation, directions of the display devices 322a and 322b change.

(Functional Configuration Example)

Figure 4:
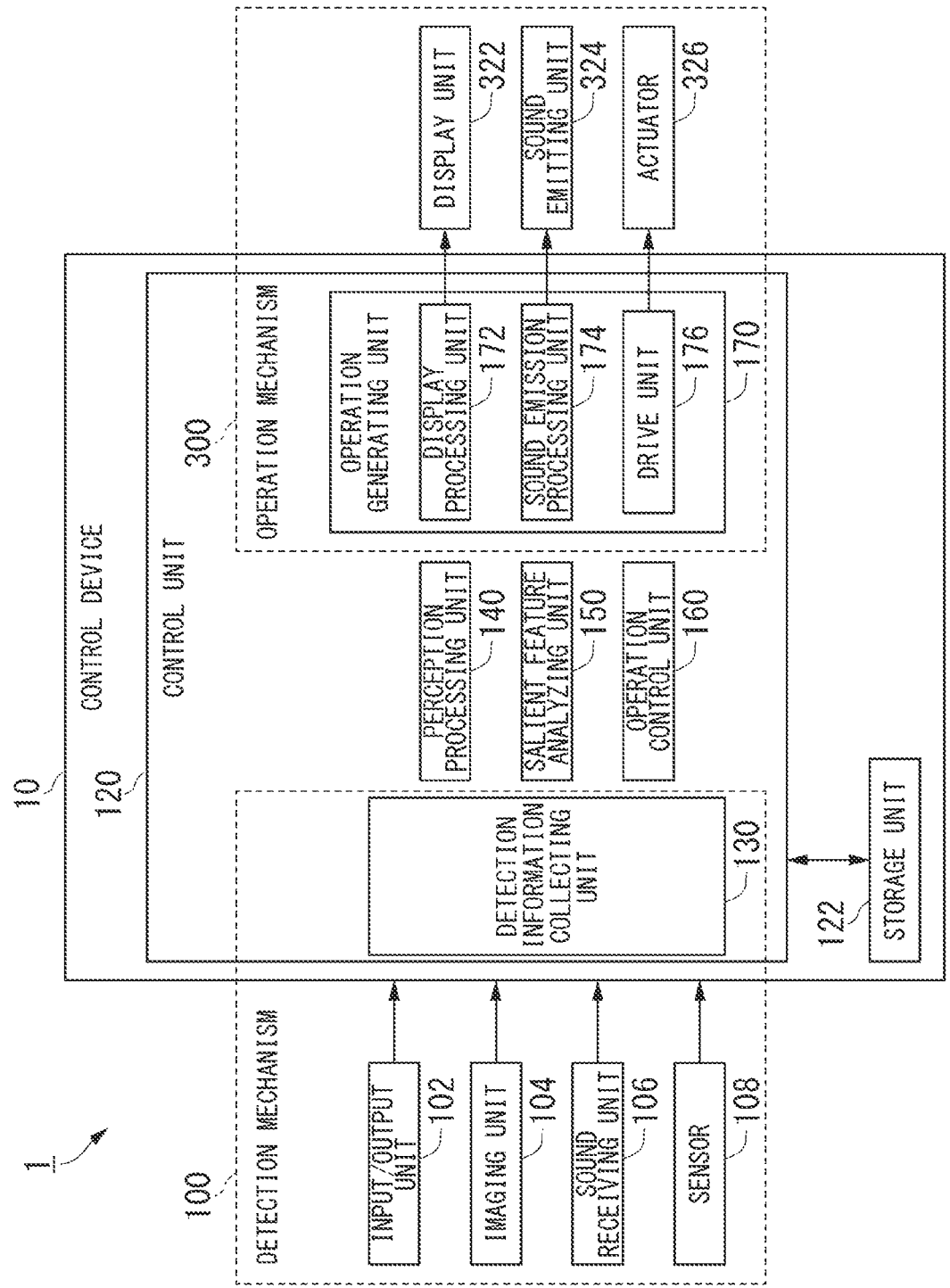
FIG. 4 is a schematic block diagram illustrating a functional configuration example of a robot system according to this embodiment.

Next, a functional configuration example of the robot system 1 according to this embodiment will be described. FIG. 4 is a schematic block diagram illustrating a functional configuration example of the robot system 1 according to this embodiment.

The robot system 1 includes a control device 10, an input/output unit 102, an imaging unit 104, a sound receiving unit 106, a sensor 108, a display unit 322, a sound emitting unit 324, and an actuator 326.

In description presented here, the input/output unit 102, the imaging unit 104, the sound receiving unit 106, and the sensor 108 may be collectively referred as a "sensor group" or a "detection unit". The sensor group detects a state of an operation environment of the robot 20 (to be described below).

The input/output unit 102 is connected to other devices in a wired manner or a wireless manner such that various kinds of data can be input and output. The input/output unit 102 outputs input data input from another device that is the other party to the control device 10 and outputs output data input from the control device 10 to another device. The input/output unit 102 may be connected to a communication network and input/output various kinds of data from/to other devices through the communication network. For example, the input/output unit 102 is configured to include an input/output interface, a communication interface, and the like.

The imaging unit 104 captures an image that represents various objects present within a visual field. For example, the imaging unit 104 includes any one of a complementary metal oxide semiconductor (CMOS) imaging element, a charge coupled device (CCD) imaging element, and the like. The imaging unit 104 outputs captured data representing a captured image to the control device 10.

The sound receiving unit 106 receives sound arriving at its own unit and outputs voice data representing the received sound to the control device 10 as sound reception data. The sound receiving unit 106 includes one or more microphones. The sound receiving unit 106 may be a microphone array. The microphone array includes a plurality of microphones. The plurality of microphones are disposed at different positions. Each of the sound reception data and the captured data represents one aspect of the surroundings of the robot 20.

The sensor 108 detects a posture of the robot 20 at that time point. The sensor 108 outputs detection data representing the detected posture to the control device 10 as sensor data. The robot 20 includes a plurality of members and an actuator 326 for each set of two members that are adjacently connected among the plurality of members, and an angle formed between the members forming the set is configured to be changeable. A posture of the robot 20 is represented using an angle formed between two members for each set of members. For example, the sensor includes an encoder. The encoder is included for each set of two members, which is an angle detection target, and functions as a sensor detecting each angle formed between members. The detected angle represents one type of an internal state of the robot. In the sensor 108, sensors (for example, a temperature sensor, an illuminance sensor, and the like) used for detecting states of the surroundings may be included. In the following description, input data, sound reception data, captured data, and sensor data may be collectively referred to as "detection data". The detection data may be multimodal data having detection information detected from an operation environment (including a posture) of the robot 20.

In description presented here, the display unit 322, the sound emitting unit 324, and the actuator 326 may be collectively referred to as an "operation unit". The operation unit realizes the operation of the robot 20.

The display unit 322 displays an image on the basis of display data that is image data input from the control device 10. For example, the display unit 322 is a display such as a liquid crystal display (LCD), an organic electro-luminescence display (OLED), or the like. The display unit 322 may include a light emitting element such as a light emitting diode (LED) in place of or together with the display.

The sound emitting unit 324 emits sound on the basis of sound emission data that is voice data input from the control device 10. The sound emitting unit 324, for example, is configured to include a speaker.

The actuator 326 causes the robot 20 to move in accordance with drive data input from the control device 10. The actuator 326 is provided for each set of two members that configure an angle which is changeable among a plurality of members configuring the robot 20. The actuator 326 changes an angle formed between two members in accordance with an input drive signal.

Each of the display data, the sound emission data, and the drive data can be regarded as data that represents an element of an operation (behavior) of the robot 20. In the following description, the display data, the sound emission data, and the drive data may be collectively referred to as "behavior data".

(Control Device)

Next, a functional configuration example of the control device 10 according to this embodiment will be described.

The control device 10 includes a control unit 120 and a storage unit 122. The control unit 120 includes a detection information collecting unit 130, a perception processing unit 140, a salient feature analyzing unit 150, an operation control unit 160, and an operation generating unit 170. Although each of the units described above may be configured to include a dedicated member, the configuration is not limited thereto. The control device 10 may include a general computer system including an arithmetic operation device and a storage medium.

For example, the arithmetic operation device is a processor such as a central processing unit (CPU). The storage medium includes a main storage device and an auxiliary storage device. For example, the main storage device is a random access memory (RAM). For example, the auxiliary storage device is a solid state drive (SSD), a hard disk drive (HDD), a read only memory (ROM; memory only for reading), or the like. The arithmetic operation device reads a predetermined program stored in an auxiliary storage device in advance and expands the read program into the auxiliary storage device. The arithmetic operation device may realize some or all of the functions of the control unit 120 and the storage unit 122 by executing a process directed in a command described in a program using the main storage device as a work area. In description presented here, execution of a process directed in a command described in any one of various programs may be simply referred to as "a program being executed" or "execution of a program".

The detection information collecting unit 130 collects detection information represented in detection data input from the sensor group and outputs the collected detection information to the perception processing unit 140. The detection information collecting unit 130 and the sensor group configure the detection mechanism 100 described above. For detection data of some types, the detection information collecting unit 130 outputs detection information represented in the input detection data to the perception processing unit 140 as it is. For detection data of the some of the other types, the detection information collecting unit 130 converts the data into information of a different format or type and outputs the information acquired through the conversion to the perception processing unit 140 as detection information as detection information. For detection data of some of the other types, the detection information collecting unit 130 converts the data into information of a different format or type and outputs the information acquired through the conversion to the perception processing unit 140 as detection information. The detection data representing various kinds of detection information may be collected as multimodal data.

The perception processing unit 140 converts a perception represented in detection information input from the detection information collecting unit 130 into element information composing a knowledge relating to the operation environment of the robot 20. This conversion corresponds to conversion of detection information into a certain symbol representation, that is, symbol grounding. More specifically, the perception processing unit 140 converts detection information input from the detection information collecting unit 130 into perception information of an attribute set in advance that corresponds to the type thereof. The knowledge relating to the operation environment of the robot 20 is updated to match the state of the operation environment of the robot 20 detected at the time point on the basis of the converted knowledge information. This technique is called anchoring.

Knowledge data representing knowledge relating to the operation environment of the robot 20 is stored in the storage unit 122. The knowledge data includes element information of a plurality of items, and the element information of the plurality of items is associated on the basis of an attribute of each item. The perception processing unit 140 updates element information of which an attribute is common to the perception information on the basis of the converted perception information. In description presented here, updated element information may be referred to as a "low-level signal". The low-level signal forms a processing result acquired by the perception processing unit 140 and corresponds to an output from a first layer of a living body.

For example, the perception processing unit 140 can determine an attribute of perception information acquired by referring to attribute data. The attribute data is data that represents an attribute of a type for each type of element information. The attribute data may be set in the perception processing unit 140 in advance or may be set with being included in knowledge data. On the other hand, the perception processing unit 140 determines presence/absence of element information of which an attribute is common to the converted perception information by referring to knowledge data stored in the storage unit 122. When it is determined that element information of which the attribute is common is present, the perception processing unit 140 substitutes the element information with the converted perception information, thereby updating the element information. On the other hand, when it is determined that element information of which an attribute is common is absent, the perception processing unit 140 adds the converted perception information to knowledge data as element information, thereby updating the element information.

In the information representing an attribute of element information, information representing presence/absence of a relation with element information of another attribute and information representing a master-servant relation in the case of presence of the relation may be included. The perception processing unit 140 can identify presence/absence of a relation between perception information that is new element information and element information of another attribute and a master-servant relation in the case of presence of the relation by referring to the attribute data. In the case of presence of the relation with the element information of another attribute, the perception processing unit 140 may identify the element information of the other attribute having the relation by referring to the attribute data and add information representing a master-servant relation with the acquired element information to the knowledge data. Generally, the perception information to be converted or such a set includes a plurality of elements and has a relationship between the plurality of elements. Such elements may relate to update of the knowledge data as element information. A specific example of the knowledge data will be described below together with a specific example of the perception processing unit 140.

The salient feature analyzing unit 150 monitors the knowledge data stored in the storage unit 122 and, when element information of a predetermined item changes, identifies a salient feature relating to an event of interest that is a change in the element information. The salient feature analyzing unit 150 outputs the changed element information and the identified salient feature to the operation control unit 160 as event of interest information representing the event of interest. The salient feature analyzing unit 150 may output the information described above with element information directly or indirectly relating to the changed element information included therein to the operation control unit 160 as the event of interest information.

For example, the salient feature analyzing unit 150 can identify an attribute of element information having an item of interest as a monitoring target item as a monitoring target of a change in the element information by referring to the related data. In the related data, information representing a monitoring target item is included and is set in the storage unit 122 in advance. As a monitoring target item, element information having an attribute relating to an operation that is a feature of the robot 20 may be set. In description presented here, element information relating to a monitoring target item may be referred to as "event of interest information" or "high-level stimuli". The high-level stimuli are output to the operation control unit 160 as a result of processing of the salient feature analyzing unit 150 and corresponds to an output from the second layer of the living body.

There are a plurality of monitoring target items. The plurality of monitoring target items are classified in advance for each common feature. This common feature corresponds to a salient feature (saliency).

The salient feature can be regarded as a characteristic of an operation environment to be focused on in responding of the robot 20. In the related data, event of interest information relating to a monitoring target item for each salient feature, that is, information representing a type of high-level stimulus is further included. The salient feature analyzing unit 150 can identify a salient feature to which an item for which a change has occurred in the element information belongs by referring to the related data. In the example illustrated in FIG. 8, pieces of event of interest information 1 to N of N kinds (here, N is an integer larger than M) are classified into salient features 1 to M of M kinds (here, M is an integer equal to or larger than 1 or 2). A specific example of the related data will be described below together with specific examples of the salient feature analyzing unit 150 and the operation control unit 160.

The operation control unit 160 refers to the related data stored in the storage unit 122 and controls the operation of the robot 20 on the basis of an operation plan relating to a salient feature identified by the salient feature analyzing unit 150. In the related data, a class and one or more pieces of event of interest information (stimulus) are associated for each salient feature, and one or more operation plans of the robot 20 are stored with being associated with each piece of event of interest information. The operation control unit 160 reads a class corresponding to a salient feature input from the salient feature analyzing unit 150 from the related data. The operation control unit 160 substitutes event of interest information input from the salient feature analyzing unit 150 into the class read as a variable and generates an instance. The operation control unit 160, by executes the generated instance, reads an operation plan corresponding to the event of interest information, generates an operation direction on the basis of the read operation plan, and outputs the generated operation direction to the operation generating unit 170.

The operation generating unit 170 operates the robot 20 in accordance with an operation direction input from the operation control unit 160. The operation generating unit 170 generates behavior data used for realizing the operation directed using the operation direction and outputs the generated behavior data to the operation unit. In the operation generating unit 170, an operation pattern may be set in advance for each instruction item. In the operation pattern, any one of movement, image display, and sound emission of the robot 20 or a combination thereof is set.

The operation generating unit 170 includes a display processing unit 172, a sound emission processing unit 174, and a drive unit 176.

The display processing unit 172 causes the display unit 322 to display an image in accordance with an operation direction. For example, in a case in which image display is included in a directed instruction item, the display processing unit 172 reads display data set in an operation pattern corresponding to the instruction item in advance and outputs the read display data to the display unit 322. For example, the display data may be an animation image representing blinking, winking, a facial expression, or the like. A display period of an image may be synchronized with a directed movement period or may not be synchronized the movement period. As illustrated in FIG. 3, the display unit 322 may include a plurality of display devices. In such a case, in an operation pattern, display data is set for each display device, and display according to the display data may be performed.

The sound emission processing unit 174 causes the sound emitting unit 324 to emit a voice in accordance with an operation direction. For example, in a case in which sound emission is included in an instruction item directed in an operation direction, the sound emission processing unit 174 causes the sound emitting unit 324 to emit a voice in accordance with an operation pattern. The sound emission processing unit 174, for example, reads sound emission data set in an operation pattern in advance and outputs the read sound emission data to the sound emitting unit 324. For example, the sound emission data may be sound such as a voice representing speech generation details, a sound effect, a music sound, or the like. The sound emission processing unit 174 may have a text voice synthesizing function. In such a case, the sound emission processing unit 174 reads a speech generation text set in advance in association with the operation pattern and synthesizes sound emission data representing a voice represented in the read speech generation text. The sound emission processing unit 174 outputs the synthesized sound emission data to the sound emitting unit 324. In accordance with an individual operation pattern, a set sound emission period may be synchronized with a movement period or may not be synchronized with the movement period.

The drive unit 176 drives the actuator 326 in accordance with an operation direction. For example, in a case in which movement is included in an instruction item directed in an operation direction, the drive unit 176 drives the actuator 326 in accordance with an operation target value of a control target member that is described in an operation pattern. The operation target value may be constant regardless of elapse of a time or may be changeable in accordance with time elapse. As an operation target value of a control target member, a position or a direction of the actuator 326 or another member (for example, the boom 242) driven by the actuator 326 or a positional relation with further another member (for example, an angle, a distance, or the like formed by the boom 242 and the casing 240) can be directed.

The operation generating unit 170 calculates a current value of a control target member at the time point on the basis of an angle of the actuator 326 represented in detection data input from the sensor 108. The operation generating unit 170 sets an electric power value for driving the actuator 326 such that a residual difference between a calculated current value and an operation target value is small and outputs drive data representing the set electric power value to the actuator 326. The actuator 326 operates by receiving supply of electric power of the electric power value represented in drive data. The operation generating unit 170 may use any technique, as long as the technique can be used for performing control such that a residual difference between a current value and an operation target value is small. For example, a controller may be any one of a PID controller, a PD controller, and the like. As in the robot 20 illustrated in FIG. 3, the robot 20 may include a plurality of actuators 326. In such a case, in an operation pattern, an operation target value is set for each actuator 326, and the operation is controlled in accordance with the set operation target value.

(Perception Processing Unit)

Figure 5:
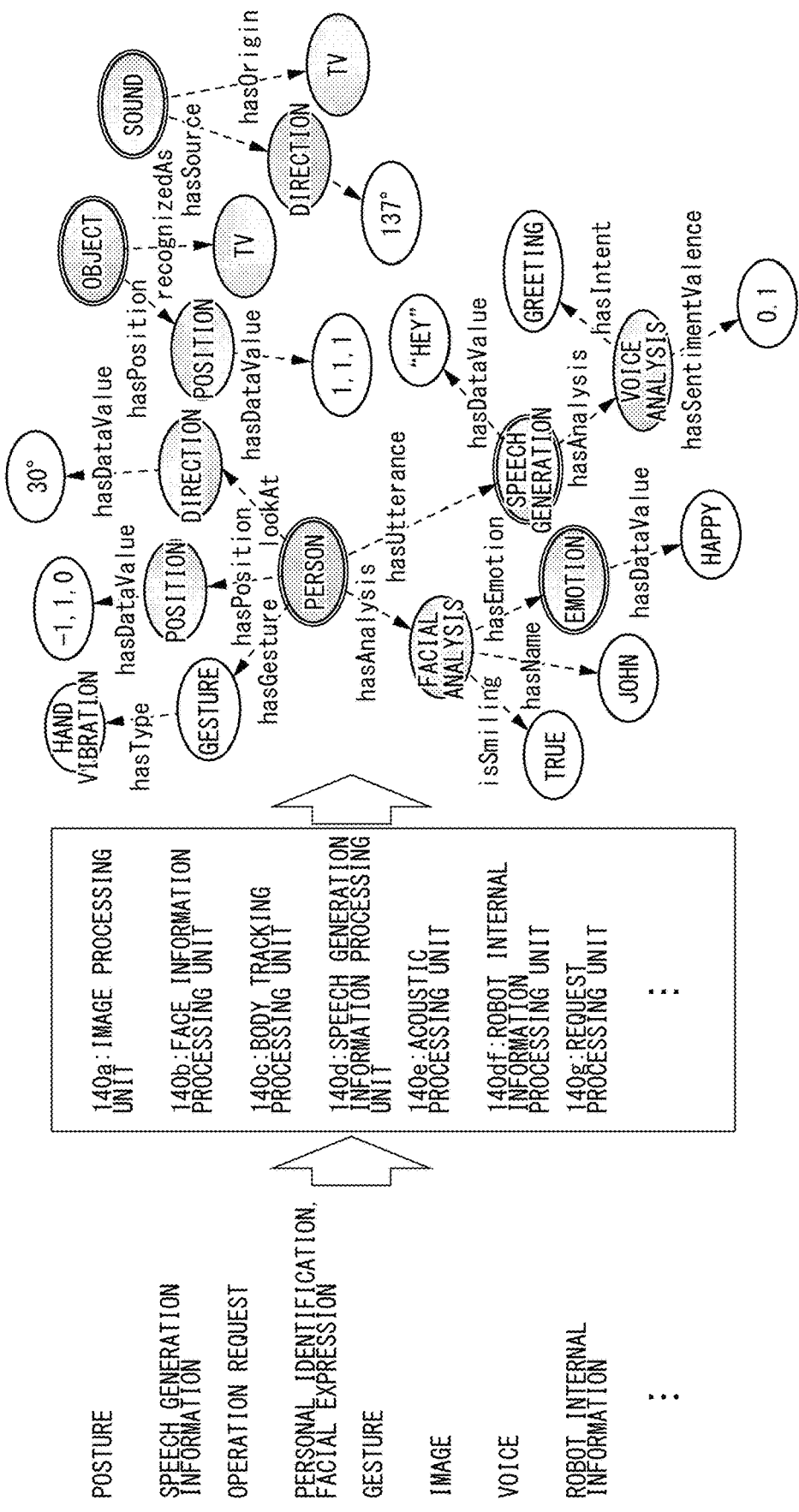
FIG. 5 is an explanatory diagram of a functional configuration example of a perception processing unit according to this embodiment.

Next, a specific example of the perception processing unit 140 according to this embodiment will be described. FIG. 5 is an explanatory diagram of a functional configuration example of the perception processing unit 140 according to this embodiment. In the example illustrated in FIG. 5, various kinds of detection information representing a perception is collected from a detection unit through the detection information collecting unit 130. The perception processing unit 140 has a function a for converting a perception II as detection information belonging to a perceptual domain A into element information belonging to a knowledge domain A. As detection information, any one of a posture of a person, speech generation information, an operation request, a personal identification, a facial expression, a gesture, an image, a voice, robot internal information, and the like or a set thereof is acquired. The detection information is delivered using any one of captured data, sound reception data, sensor data, and the like or a combination thereof as an information source (source) 6, composing detection data.

The perception processing unit 140 performs conversion into perception information of various attributes that are candidates for element information. The perception processing unit 140 includes a functional module used for realizing a function for conversion into perception information. For example, as the functional module, any one of an image processing unit 140a, a face information processing unit 140b, a body tracking processing unit 140c, a speech generation information processing unit 140d, an acoustic processing unit 140e, a robot internal information processing unit 140f, and a request processing unit 140g or a combination thereof is provided.

The image processing unit 140a performs known image recognition on captured data and tries to recognize an object area in which an object appearing in an image represented in captured data is expressed. The image processing unit 140a acquires information such as a type and the like of an object recognized (analyzed) from the image recognition as perception information.

The face information processing unit 140b performs known facial information processing and tries to detect a facial area in which a face of a person appears from an image from captured data. The face information processing unit 140b acquires information such as a personal identification, a facial expression, and the like of a person recognized (analyzed) from a facial area in the facial information processing as perception information.

The body tracking processing unit 140c performs known body tracking on captured data and tries to detect a human body area in which a human body appears from an image represented in the captured data. The body tracking processing unit 140c acquires a posture of a human body recognized (analyzed) from a human body area in the body tracking as perception information. The body tracking processing unit 140c may identify predetermined parts (for example, a head part, a cervical part, an upper arm, a hand, a finger, and the like) of a human body recognized from a human body area and acquire a position and an orientation of each identified part and a change in a positional relation between the parts over time as gestures. The acquired gesture can be perception information as well.

When a facial area and a human body area detected from captured data overlap each other in at least a part, the perception processing unit 140 can determine that element information acquired from the facial area and the human body area are element information of the same person.

The perception processing unit 140 can estimate one or both of a direction of an object appearing in an object area and a direction of a person appearing in a facial area and a human body area on the basis of a direction and a visual field of the imaging unit 104 estimated from a posture of the robot 20. The posture of the robot 20 is detected by the robot internal information processing unit 140f.

The speech generation information processing unit 140d performs known speech recognition on reception sound data of at least one channel and tries to recognize speech generation details delivered using voices and a speaker (person) represented in the reception sound data. The speech generation information processing unit 140d acquires the person and the speech generation details that have been recognized (analyzed) as perception information. The speech generation information processing unit 140d may analyze an intention of a speaker, a sentiment valence, and the like from a spoken voice represented in the sound reception data. The sentiment valence is a value representing a strength of emotion accompanying speech generation.

The acoustic processing unit 140e performs a known sound source positioning process on reception sound data of a plurality of channels and estimates (analyzes) a direction of a sound source. The acoustic processing unit 140e may estimate a position of a sound source on the basis phase differences between three or more pieces of reception sound data. In a case in which the number of estimated sound sources is two or more, the acoustic processing unit 140e performs a known sound source separating process on reception sound data and separates the reception sound data into sound source data representing a component of each sound source. The acoustic processing unit 140e performs a known sound source positioning process on reception sound data or separated sound source data and estimates a type of object that is a sound source. As a candidate for an estimated type of object, a spoken voice of a person may be included as well. A type and a direction of an object that are estimated are acquired as perception information. In a case in which the type of sound source estimated from the separated sound source data is a spoken voice of a person, the speech generation information processing unit 140d may perform the voice recognizing process described above on the sound source data.

In a case in which an angle formed by a direction of an object estimated from the reception sound data or the separated sound source data and a direction of an object estimated from an object area detected from the captured data is smaller than a threshold of a predetermined angle, the perception processing unit 140 may determine element information estimated from the reception sound data or the sound source data and perception information recognized from the object area as perception information of the same object. In a case in which an angle formed by a direction of a person as an object estimated from the reception sound data or the separated sound source data and a direction of a person estimated from a human body area or a facial area detected from the captured data is smaller than a threshold value of a predetermined angle, the perception processing unit 140 may estimate perception information recognized from the reception sound data or the sound source data as perception information of the same person.

The robot internal information processing unit 140f can estimate, for example, a posture of the robot 20 as robot internal information by analyzing sensor data acquired from the sensor 108. The robot internal information processing unit 140f can estimate a change in the estimated posture over time as movement of the robot 20. The robot internal information processing unit 140f can determine the posture of the robot 20 from an angle formed by members adjacent to each other, which is represented in the sensor data, and a shape of each member among a plurality of members composing the robot 20. As robot internal information, information representing states such as a temperature, power consumption, a movement speed, and the like may be acquired. The acquired information can be set as perception information as well.

The request processing unit 140g estimates a request for the robot 20 that has been instructed by a person who is a user. For example, in the request processing unit 140g, request data representing a phrase indicating a request item for the robot 20 as a request phrase is set in advance. The request item indicated using a request phrase, for example, is processed as an operation direction (command) for the robot 20, generated speech composing a conversation with the robot 20, and the like by the control unit 120. The request processing unit 140g detects a spoken request phrase from spoken details by combining a text representing spoken details recognized by the speech generation information processing unit 140d and each request phrase. The request data may be configured to further include information that represents a type of gesture corresponding to each request phrase. The request processing unit 140g detects a request phrase corresponding to a type of gesture recognized by the body tracking processing unit 140c by referring to request data. A request item represented in the detected request phrase can be set as perception information as well. The request processing unit 140g may acquire perception information representing a request item from input data input from the input/output unit 102.

(Knowledge Data)

Next, knowledge data according to this embodiment will be described. Items of a knowledge area A illustrated in FIG. 5 represent specific examples of the knowledge data. The illustrated knowledge data is represented using a resource description framework (RDF) format. For example, the knowledge data may be configured as ontology described using a web ontology language (OWL). For example, an attribute $C(yi)$ of each piece of element information and a relation $(P(yi, zj))$ between pieces of element information are described using a format of a class property. By using the class property, a data property and an object property representing attributes thereof are defined in relation with other element information. As an attribute of each piece of element information, a type thereof may be directed. In the RDF format, a hierarchical relation of attributes of a plurality of pieces of element information is expressed using a plurality of items (nodes) and a master-servant relation (a link) between items for each pair of two items.

The perception processing unit 140 generates an individual representing an item of element information every time the element information is added. The individual corresponds to an instance forming an entity of a class. A node representing an individual is denoted by a colored circle in FIG. 5. A double circle represents a unit in which element information is updated once by the perception processing unit 140. In other words, knowledge information converted from detection information that has been newly acquired by the perception processing unit 140 is allocated as a part or the whole of element information represented at a node associated with a lower rank of a node of a double circle in accordance with substitution or addition. In description presented here, a unit of this element information may be referred to as "low-level stimuli". The low-level stimuli compose a process result acquired by the perception processing unit 140 and corresponds to an output from the first layer of a living body.

In the example illustrated in FIG. 5, as attributes relating to a person, a relevance with a face analysis, speech generation, a direction, a position, and a gesture is described using a has Analysis property, a hasUtterance property, a hasPosition property, a lookAt property, and a hasGesture property. As a result of face information processing (a facial analysis) of captured data, in other words, as attributes relating to the facial analysis, values "true" and "John" representing element information having a smiling state and a personal identification (a name) as attributes are respectively described using an isSmiling property and a hasName property. As an attribute relating to the facial analysis, a relevance with an emotion is further described using a hasEmotion property. As a value of element information having an attribute relating to an emotion, "happy" is described using a hasDataValue property.

(Generation Rule)

The knowledge data may be updated on the basis of element information that has been newly generated on a generation rule set in advance. Generation rule data representing a generation rule is set in the storage unit 122 in advance. In the generation rule data, element information of a specific item is included with being associated with information representing a generation rule representing an estimation condition of another element information estimated from the element information. The generation rule data may be included in the knowledge data or may be configured separately from the knowledge data.

The salient feature analyzing unit 150 identifies element information of an attribute of which a generation rule has been set by referring to the generation rule data and determines whether or not the identified element information satisfies the set estimation condition. In a case in which it is determined that the estimation condition is satisfied, the salient feature analyzing unit 150 may add element information representing concept information thereof to the knowledge data in association with the specified element information. An element condition composing an estimation condition set in one generation rule is not limited to one item but may be applied to two or more items. In addition, element information evaluated in each element condition is not limited to one item but may be applied to a plurality of items. The salient feature analyzing unit 150 may determine whether or not the estimation condition is satisfied when a part or all of the element information of the attribute of which the rule is set is updated. In a case in which element information of the same attribute as that of other element information that is newly estimated has already been included in the related data, the salient feature analyzing unit 150 may substitute the existing element information with the estimated element information. The other element information that has been estimated may also be included in an item that is a monitoring target.

FIG. 6 is a diagram illustrating a first example of a generation rule of element information according to this embodiment. The generation rule illustrated in FIG. 6 is described using a semantic web rule language (SWRL). This generation rule includes element conditions of two items of having an analysis result (analysis) of emotion for a certain person (person) (hasAnalysis) and indicating that the analysis result represents a smiling state (isSmiling) as estimation conditions. Each element conditions ha two variables (arguments) as evaluation targets. Thus, when this estimation condition is satisfied by an analysis result of emotions as element information that directly or indirectly relates to the person, it is estimated that it is true (true) that the person is in a good mood (isInGoodMood). As illustrated in FIG. 5, the estimated new element information is added to the knowledge data in association with the facial analysis result of the person.

There are cases in which the salient feature analyzing unit 150 detects a new person on the basis of the converted perception information. For example, there are a case in which a person is detected for the first time in a voice represented in reception sound data, an image represented in captured data, or the like, a case in which a person different from the person who has been already detected is detected, and the like. At this time, the salient feature analyzing unit 150 may generate a new item for each attribute of element information relating to the detected person. The salient feature analyzing unit 150 adds element information relating to the person of an attribute corresponding to the generated item to the knowledge data. Then, the salient feature analyzing unit 150 may recognize (detect) a change in the element information of an item having appearance of the person (PersonAppears) as a monitoring target. The salient feature analyzing unit 150 outputs novelty to the operation control unit 160 as a salient feature relating to the appearance of the person and outputs the appearance of the person and identification information of the person who has appeared to the operation control unit 160 as event information (stimulus).

A process relating to detection of a new person may be described in advance as a generation rule. FIG. 7 is a diagram illustrating a second example of a generation rule of element information according to this embodiment. The rule illustrated in FIG. 7 includes addition of a new person (?person) (Person) and generation of a new item for each attribute of element information (?stimuli) of a new person (?person) and addition of the generated new item to the knowledge data (makeOWLIndivisual) as element conditions. After such a process is performed, as an element condition, it is illustrated that a change (?stimulus) in the element information of an item having element information (PersonAppears) representing appearance of a person (PersonAppears) as a monitoring target is recognized.

(Related Data)

Figure 8:
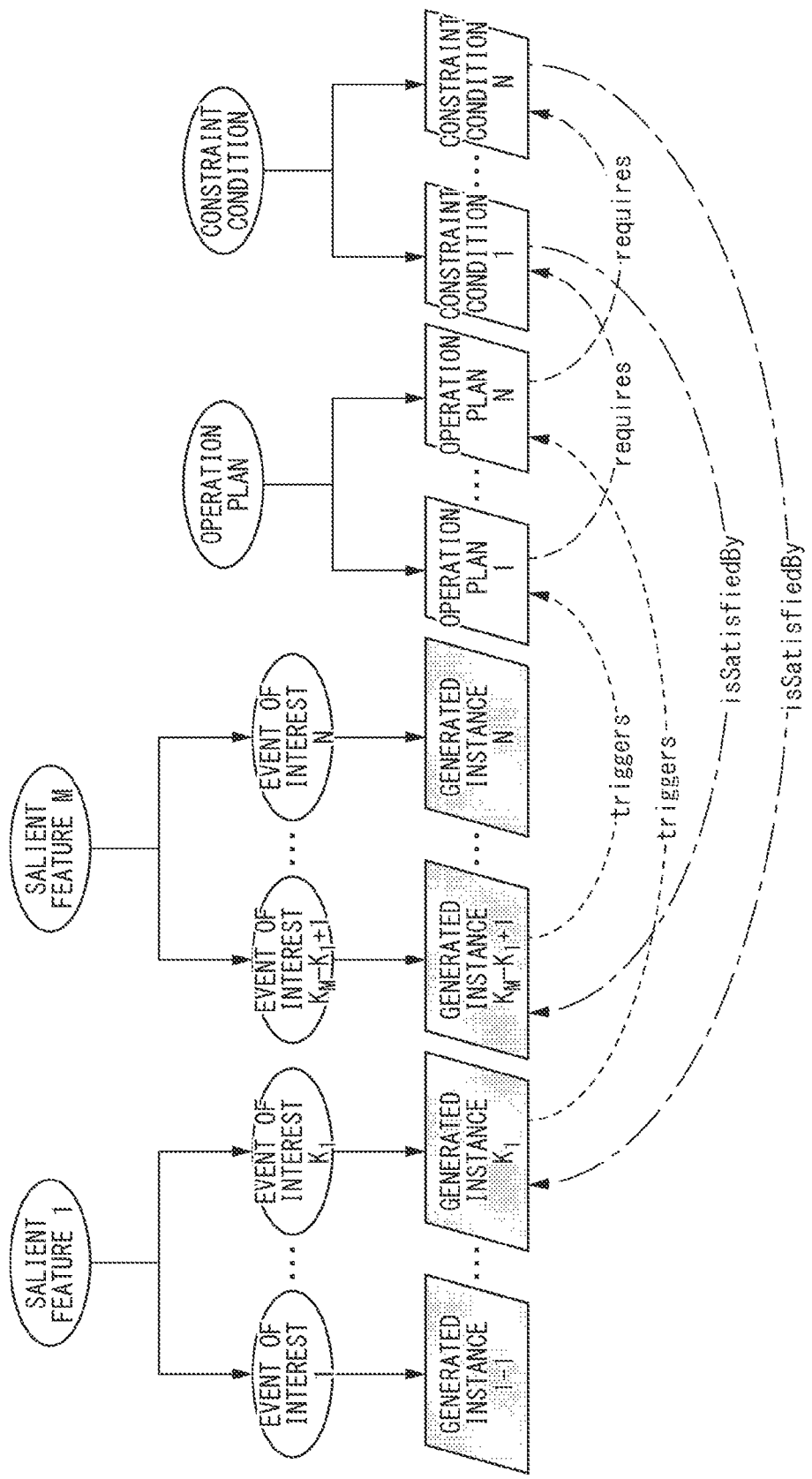
FIG. 8 is a diagram illustrating a configuration example of related data according to this embodiment.

Next, a specific example of related data will be described. FIG. 8 is a diagram illustrating a configuration example of the related data according to this embodiment. In the illustrated related data, for each salient feature, a class and one or more pieces of event of interest information (stimulus) are associated, and for each piece of event of interest information, one or more operation plans of the robot 20 are associated and stored. For example, the related data may be configured as an ontology described using the OWL. For example, the salient feature is described using a salient features class. For example, reading of an operation plan can be directed using a triggers property in an instance (instance).

The operation control unit 160 reads a class, which corresponds to a salient feature input from the salient feature analyzing unit 150, from the related data. The operation control unit 160 substitutes event of interest information input from the salient feature analyzing unit 150 into the read class as a variable, thereby generating an instance. The operation control unit 160 executes the generated instance, reads an operation plan corresponding to the event of interest information, reads an operation plan in accordance with the generated instance by referring to the related data, and generates an operation instruction that has been read. By outputting the generated operation instruction to the operation generating unit 170, the operation control unit 160 controls the operation of the robot 20. For example, reading of an operation plan is directed using a triggers property in an instance.

In the related data, event of interest information with which a constraint condition (constraint) is associated may be further included. In the example illustrated in FIG. 8, constraint conditions 1 to N are respectively associated with operation plans 1 to N. Referring to and evaluation of a constraint condition is directed using a requires property in a corresponding operation plan. The event of interest information satisfying the corresponding constraint condition is set as a control condition based on the operation plan for the robot 20. For example, the satisfaction of a constraint condition being set as a condition for executing an operation plan is directed using an isSatisfiedBy property in an instance of the operation plan.

FIG. 9 is a diagram illustrating a correspondence relation between a salient feature, event of interest information, and an operation plan according to this embodiment. In the example illustrated in FIG. 9, familiarity, referencing, novelty, and unexpectedness can be exemplified as salient features. For example, in the event of interest information, appearance of a person and disappearance of a person are classified into novelty. As an operation plan, a greeting is associated with appearance of a person, and farewell is associated with disappearance of a person.

As described above, by using a common class for a certain salient feature, different pieces of event of interest information have functions relating to features and sequences of operations in common, and a difference between operation forms and a difference in the event of interest information occur in accordance with parameters. For example, between appearance of a person and a disappearance of a person that relate to novelty, operations are common in that the operations are performed in directions of persons. When the event of interest information represents appearance of a person, the operation control unit 160 reads a class corresponding to novelty by referring to the related data and generates an instance by substituting the event of interest information into the read class. The operation control unit 160 executes the generated instance, reads an operation plan relating to greeting, and can operate the robot 20 in accordance with the read operation plan.

(Execution Example of Operation Plan)

Figure 10:
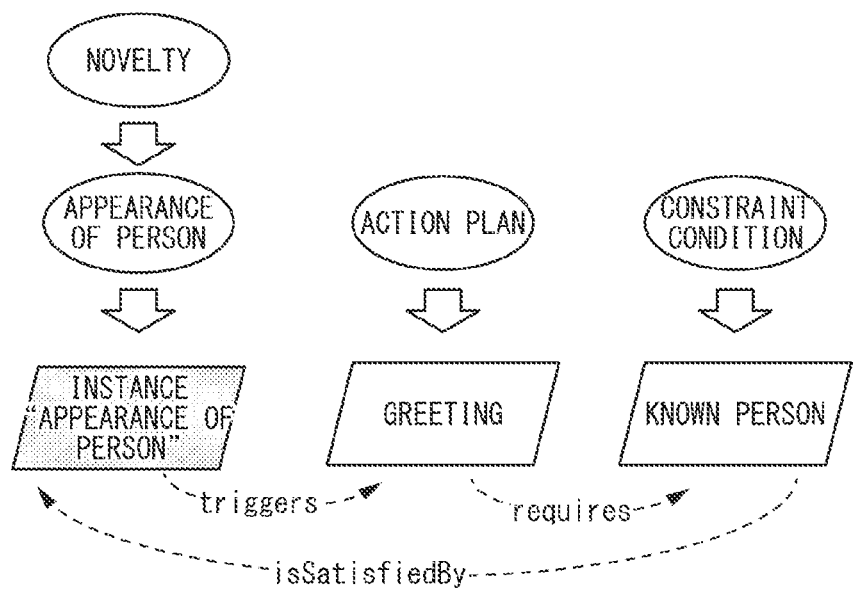
FIG. 10 is an explanatory diagram illustrating an execution example of an operation plan according to this embodiment.

Next, an execution example of an operation plan according to this embodiment will be described. FIG. 10 is an explanatory diagram illustrating an execution example of an operation plan according to this embodiment. In the example illustrated in FIG. 10, it is assumed that "appearance of a person" is notified as the event of interest information. The operation control unit 160 identifies novelty as a salient feature notified from the salient feature analyzing unit 150 and reads a class corresponding to the identified novelty from the related data. The operation control unit 160 substitutes the event of interest information input from the salient feature analyzing unit 150 into the read class and generates an instance relating to "appearance of a person". The operation control unit 160 executes the generated instance, identifies "greeting" as a corresponding action plan, and identifies "known person" as a constraint condition corresponding to the action plan. The "known person" represents an event for which identification information of a recognized person coincides with identification information of one of known persons set in advance. The operation control unit 160 can determine whether or not a constraint condition is satisfied by collating identification information of a person represented from the event of interest information and identification information of each of persons set in advance in the operation control unit 160 and determining whether or not a known person whose identification information coincides with the identification information described above is present. In a case in which the constraint condition is satisfied, the operation control unit 160 outputs an operation instruction representing a greeting as a corresponding action plan to the operation generating unit 170. In a case in which the constraint condition is not satisfied, the operation control unit 160 does not perform control of the robot 20 according to a corresponding action plan.

By using an operation plan relating to a greeting, the operation control unit 160 can cause the robot 20 to give a greeting to a person who has appeared. By extracting information of a direction of a person included in the event of interest information, the operation control unit 160 can identify the direction. When an operation instruction is generated in accordance with an operation plan, for example, the operation control unit 160 includes the following instruction items (1) to (3) set in the operation plan in the operation instruction in that order. (1) Causing the boom (a main body) to turn in a specific direction (2) Inclining to the front side of the boom at a predetermined angle from an upright state (3) Return of the boom to standing upright from state being inclined to the front side The operation generating unit 170 reads instruction items included in an operation instruction input from the operation control unit 160 in that order and operates the robot 20 in accordance with the read instruction items. For example, in an operation pattern for "turning of the boom in a specific direction" as an instruction item, the actuator 326 rotating the boom 242 as a control target member in parallel with a horizontal plane receives an instruction. As a target direction as an operation target value, over a time after T1 seconds (for example, 1 to 2 seconds) from a time of an operation start time point, a linear change is set until reach of an azimuth angle of a predetermined direction from an azimuth angle of the front face direction of the boom 242 detected as an operation start time point.

In an operation pattern for "Inclining to the front side of the boom at a predetermined angle from an upright state", the actuator 326 rotating the boom 242 as a control target member in parallel with a median plane that is in parallel with the front face direction receives an instruction. As a target direction as an operation target value, over a time after T2 seconds (for example, 2 to 3 seconds) from a time of an operation start time point, a linear change is set until reach of an azimuth angle of a vertex direction of the boom 242 at an operation start time point to θ (for example, 45 to 70 degrees) from 90 degrees.

In an operation pattern for "return of the boom to standing upright from state being inclined to the front side", the actuator 326 rotating the boom as a control target member in parallel with a median plane that is in parallel with the front face direction receives an instruction. As a target direction as an operation target value, over a time after T3 seconds (for example, 2 to 3 seconds) from a time of an operation start time point, a linear change is set until reach of an azimuth angle of the vertex direction of the boom at an operation start time point to 90 degrees from θ angles.

Next, an evaluation test performed for the robot system 1 according to this embodiment will be described. In the test, mainly, responsiveness in exchange with a person was evaluated using 50 stimuli. In accordance with each stimulus, the environment is different. In a factor of the environment, one of a change in the situation, a conversation, and a gesture is included. As changes in the situation, there are appearance, disappearance, and the like of a person. As the conversation, there are a speech generation emotion, an intention, a request using a language, and the like. In the knowledge data, as related data, ontologies having 1,000 classes, 500 properties, and 80 individuals were collected. As rules used for generation of new element information, rules in which the number of evaluation items and the number of variables that are evaluation targets are different were used.

Figure 11:
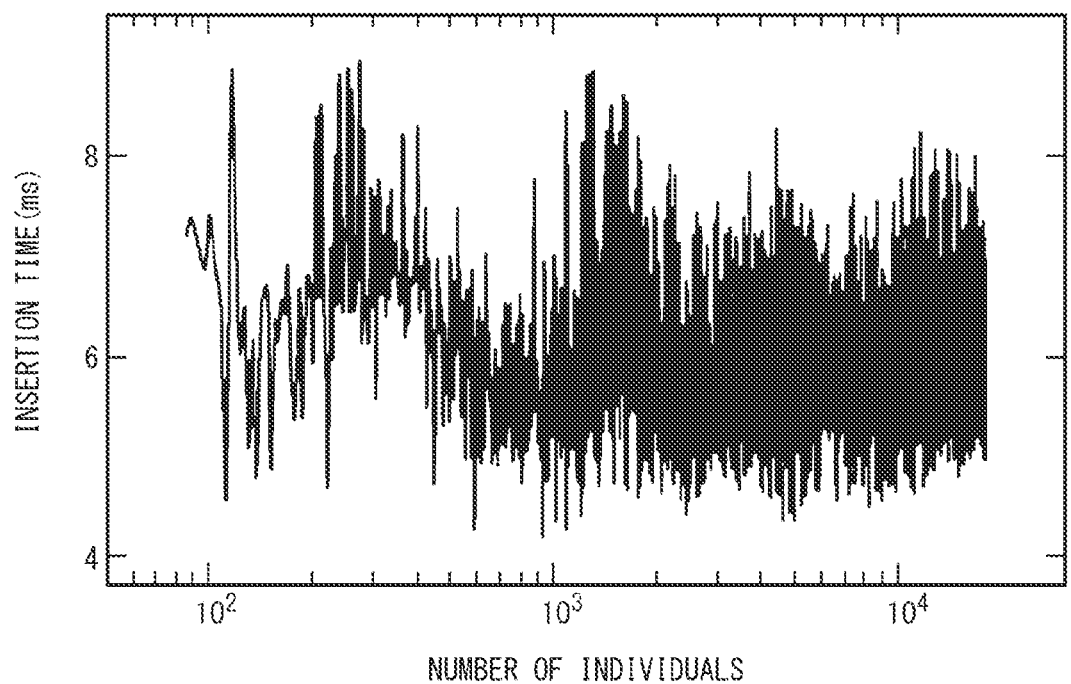
FIG. 11 is a diagram illustrating an evaluation example of an insertion time.

In an evaluation test, as a first evaluation item, an insertion time according to perception processing unit 140 was evaluated. The insertion time corresponds to a time until an individual is generated and is added to the knowledge data after new knowledge information is acquired. In this process, an attribute of existing element information and an attribute of new knowledge information are combined in the knowledge data. FIG. 11 is a diagram illustrating an evaluation example of an insertion time. In the example illustrated in FIG. 11, in the insertion time, meaningful dependency on the number of individuals included in the knowledge data is not recognized. When the number of individuals is in the range of 100 to 20,000, the insertion time enters the range of 5 to 7 ms as a whole.

As a second evaluation item, a generation time according to the salient feature analyzing unit 150 was evaluated. The generation time corresponds to a time from an evaluation of a rule accompanying update of monitoring target items in the knowledge data to a time when event information (stimulus) output to the operation control unit 160 is generated. In this process, monitoring of a change in each piece of element information that is a monitoring target item in the knowledge data and an evaluation of an estimation condition based on changed element information intervene. As evaluation conditions of the generation time, the generation time was collected for each combination of presence/absence of anchoring and the number of items of element conditions composing the rule.

Figure 12:
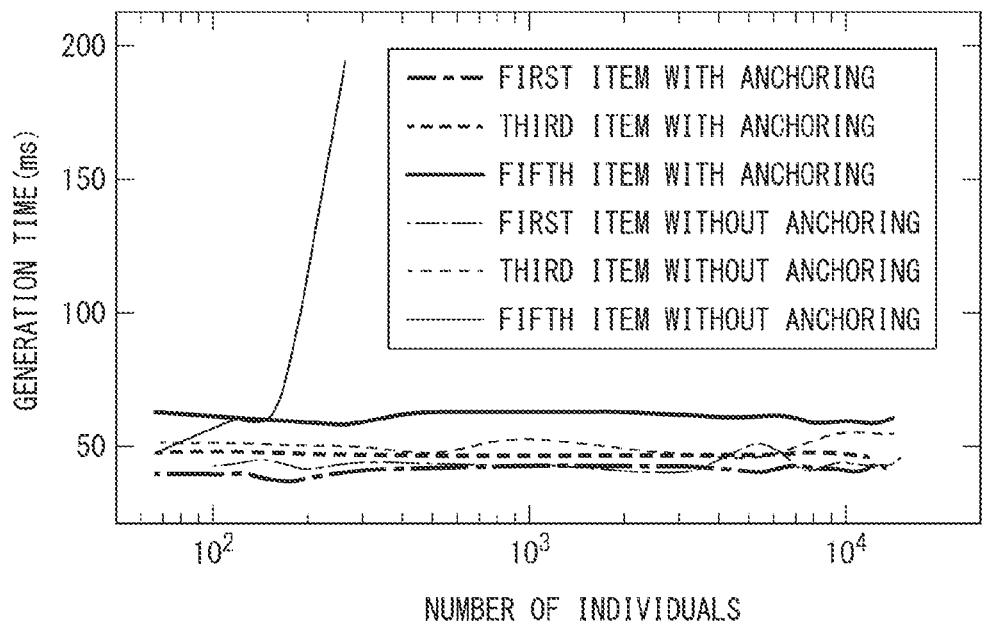
FIG. 12 is a diagram illustrating an evaluation example of a generation time.

FIG. 12 is a diagram illustrating an evaluation example of the generation time. In the example illustrated in FIG. 12, a trend of an increase in the generation time accompanying an increase in the number of items of the element condition is recognized regardless of presence/absence of anchoring. In a case in which anchoring is accompanied, the generation time is more meaningful than in a case in which anchoring is not accompanied. Particularly, in a case in which the number of items of the element condition is 5, differently from a case in which the number of items is three or less, the generation time markedly increase in accompaniment with an increase in the number of individuals. In a case in which new element information is sequentially evaluated without performing anchoring, an increase in the amount of processing according to the number of combinations of items of the element condition is considered to be a main factor of an increase in the generation time.

As a third evaluation item, a dispatch time according to the operation control unit 160 was evaluated. The dispatch time corresponds to a time from input of event information (stimuli) to the operation control unit 160 to output of an operation instruction to the operation generating unit 170. In this process, reading of an operation plan and an evaluation of a constraint condition intervene. As evaluation conditions of the dispatch time, the dispatch time was collected for each combination of the number of operation plans triggered in accordance with input of one stimulus and the number of items of constraint conditions for each operation plan.

Figure 13:
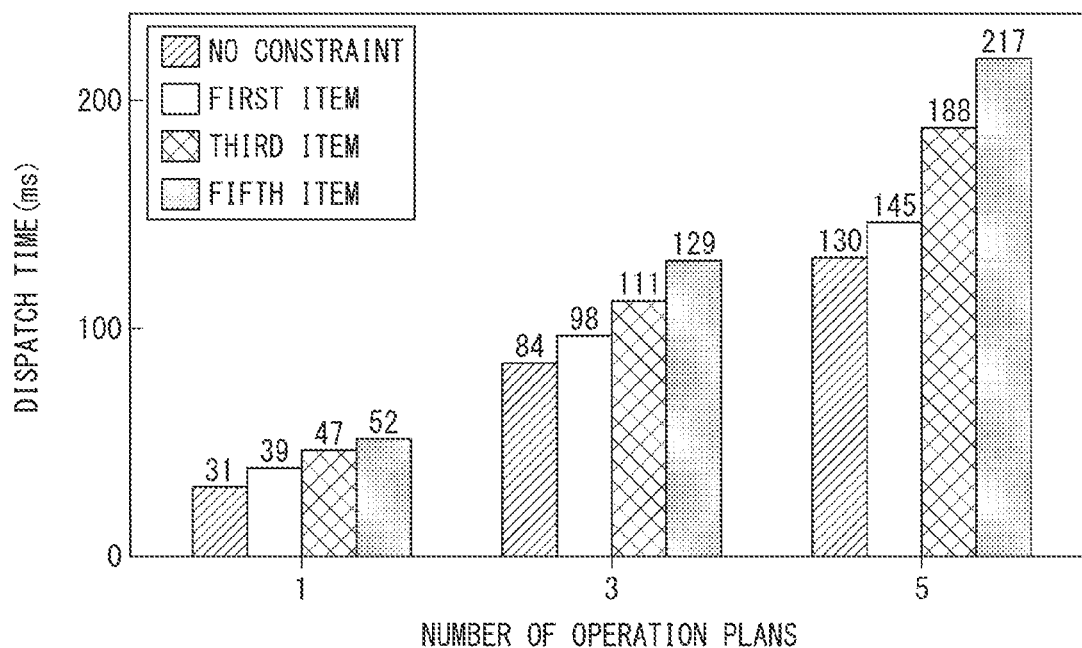
FIG. 13 is a diagram illustrating an evaluation example of a dispatch time.

FIG. 13 is a diagram illustrating an evaluation example of the dispatch time. In the example illustrated in FIG. 13, the dispatch time increases in accordance with an increase in the number of triggered operation plans. The dispatch time increases in accordance with an increase in the number of items of the constraint conditions. In FIG. 13, "No constraint" represents that no constraint condition is set, in other words, the number of items is 0. This result represents that an increase in the number of operation plans or an increase in the number of items of the constraint conditions has an influence on an increase in a response time from a stimulus for the robot 20 to reflection thereof on the operation. Here, the response time approximately linearly increases in accordance with an increase in the number of operation plans or the number of items of the constraint conditions. The response time enters a predictable or allowable range in accordance with an operation form and an increase in the number of situations of operation environments to be responded.

MODIFIED EXAMPLE

The embodiment described above may be modified and realized. In the modifications, substitutions of some components with other components, combinations of some components with other components, and omission of some components are included. For example, although the robot 20 illustrated in FIG. 4 is configured as a companion robot, the external configuration of the robot 20 is not limited thereto. The robot 20 may be configured as a biped walking robot, a vehicle-wheels attached robot, or the like. The control device 10 may be configured separately from the main body of the robot 20. In such a case, the robot 20 includes a detection unit and an operation unit and may be connected to the control device 10 in a wired manner or a wireless manner such that it can transmit and receive various kinds of data.

The process of adding element information to the knowledge data on the basis of the rules described above may be performed by the perception processing unit 140 in place of the salient feature analyzing unit 150. As illustrated in FIG. 6, the process of adding element information to the knowledge data without accompanying output of event information (stimulus) may be performed by the perception processing unit 140, and, as illustrated in FIG. 7, the process of adding element information to the knowledge data in accompaniment with output of event information (stimulus) may be performed by the salient feature analyzing unit 150.

As described above, the control device 10 according to this embodiment includes a control unit 120 configured to monitor knowledge data in which element information relating to an operation environment of a robot 20 is integrated and, when the element information of a predetermined item changes, identify a salient feature relating to the element information of the item, and operate the robot 20 on the basis of an operation plan relating to a salient feature identified from related data representing at least a relevance between the salient feature and the operation plan of the robot.

According to this configuration, when the element information of a predetermined item of knowledge data integrated in the knowledge data changes, a salient feature relating to the element information of the changed item is identified. The robot 20 is operated on the basis of an operation plan relating to a salient feature identified from related data. By setting element information of an item of which a change is to be monitored in association with a salient feature in advance, the robot 20 can be quickly operated in accordance with a change in the element information of the item.

In the related data, a constraint condition may be associated with at least some of the operation plans. The control unit 120 may determine whether or not the element information of the predetermined item satisfies a constraint condition corresponding to an operation plan relating to the identified salient feature and, when the constraint condition is not satisfied, be configured not to operate the robot 20 on the basis of the operation plan relating to the salient feature.

According to this configuration, in a case in which a constraint condition is satisfied for an operation plan with which the constraint condition is associated, the robot 20 can be operated in accordance with the operation plan. For this reason, necessity and non-necessity of an operation are controlled in accordance with a more detailed situation of an operation environment of the robot 20.

The knowledge data includes element information of a plurality of items, and the element information of the plurality of items may be associated on the basis of attributes of the items.

The control unit 120 may convert detection information detected from the operation environment into perception information of an attribute set in advance and update element information of which an attribute is common to the perception information on the basis of the converted perception information.

According to this configuration, various kinds of knowledge data representing an operation environment of a robot is hierarchically described, and element information of which an attribute is common is updated in accordance with movement of perception information converted from detection information. Since element information relating to an item in which movement has occurred is focused on among items that are items in which element information that is a processing target is a monitoring target, the robot 20 can be quickly operated as a response to a change in the operation environment.

In the related data, with element information of a specific item, a rule representing an estimation condition of other element information relating to the element information may be associated. When the element information of the specific item satisfies the estimation condition, the control unit 120 may add the other element information to the knowledge data as element information relating to the element information of the specific item.

According to this configuration, when element information of a specific item satisfies an estimation condition represented in a rule, other element information relating to the element information is estimated. The estimated other element information can be referred to in the identifying of a salient feature. Even other element information not directly derived from an operation environment can be acquired from element information that is directly derived. For this reason, for the robot 20, more varied operations can be realized on the basis of the other element information that is estimated.

When at least a part of the element information of the specific item is updated, the control unit 120 may determine whether or not the estimation condition is satisfied.

According this configuration, a process relating to determining whether an estimation condition is satisfied is not performed when element information not relating to element information of a specific item is updated or in a case in which even element information relating to a specific item is not updated. For this reason, a reactive behavior based on update of element information relating to a specific item can be quickly realized.

When a new person is detected on the basis of the perception information, the control unit 120 may generate a new item for each attribute relating to the person and add element information, which relates to the person, of an attribute corresponding to the generated items to the knowledge data.

According to this configuration, element information based on detection information can be hierarchically managed in accordance with detection of a new person. For this reason, for the robot 20, an operation corresponding to an attribute or an operation of each person can be efficiently realized.

While one embodiment of the present invention has been described in detail with reference to the drawings, it should be understood that a specific configuration is not limited to that described above, and various changes in design and the like can be made within a range not departing from the concept of the present invention.

What is claimed is:

1. A control device comprising:
a control unit configured to monitor knowledge data in which element information relating to an operation environment of a robot is integrated and, when the element information of a predetermined item changes, identify a salient feature relating to the element information of the item, and operate the robot on the basis of an operation plan relating to a salient feature identified from related data representing at least a relevance between the salient feature and the operation plan of the robot,
wherein, in the related data, a constraint condition is associated with at least some of the operation plans, and
wherein the control unit determines whether or not the element information of the predetermined item satisfies a constraint condition corresponding to an operation plan relating to the identified salient feature and, when the constraint condition is not satisfied, does not operate the robot on the basis of the operation plan relating to the salient feature,
wherein the knowledge data includes element information of a plurality of items, and the element information of the plurality of items is associated on the basis of attributes of the items, and
wherein the control unit converts detection information detected from the operation environment into perception information of an attribute set in advance and updates element information of which an attribute is common to the perception information on the basis of the perception information, and
wherein a class and event of interest information are associated for each salient feature in the related data, and
wherein the control unit
reads a common class for the salient feature,
generates an instance by substituting the event of interest information into the read class,
executes the generated instance,
reads the operation plan corresponding to the event of interest information, and
operates the robot in accordance with the read operation plan.

2. The control device according to claim 1,
wherein, in the related data, with element information of a specific item, a rule representing an estimation condition of other element information relating to the element information is associated, and
wherein, when the element information of the specific item satisfies the estimation condition, the control unit adds the other element information to the knowledge data as element information relating to the element information of the specific item.

3. The control device according to claim 2, wherein, when at least a part of the element information of the specific item is updated, the control unit determines whether or not the estimation condition is satisfied.

4. The control device according to claim 1, wherein, when a new person is detected on the basis of the perception information, the control unit generates a new item for each attribute relating to the person and adds element information, which relates to the person, of an attribute corresponding to the generated items to the knowledge data.

5. A robot system comprising:
a robot; and
the control device according to claim 1.

6. A computer-readable non-transitory storage medium storing a program for causing a computer to function as the control device according to claim 1.

7. A control method for a control device, the control method using the control device comprising:
monitoring knowledge data in which element information relating to an operation environment of a robot is integrated and, when the element information of a predetermined item changes, identifying a salient feature relating to the element information of the item;
operating the robot on the basis of an operation plan relating to a salient feature identified from related data representing at least a relevance between the salient feature and the operation plan of the robot,
wherein, in the related data, a constraint condition is associated with at least some of the operation plans;
determining whether or not the element information of the predetermined item satisfies a constraint condition corresponding to an operation plan relating to the identified salient feature and, when the constraint condition is not satisfied, not operating the robot on the basis of the operation plan relating to the salient feature,
wherein the knowledge data includes element information of a plurality of items, and the element information of the plurality of items is associated on the basis of attributes of the items;
converting detection information detected from the operation environment into perception information of an attribute set in advance and updates element information of which an attribute is common to the perception information on the basis of the perception information,
wherein a class and event of interest information are associated for each salient feature in the related data;
reading a common class for the salient feature;
generating an instance by substituting the event of interest information into the read class;
executing the generated instance;
reading the operation plan corresponding to the event of interest information; and
operating the robot in accordance with the read operation plan.

* * * * *